(12) United States Patent
Holmes

(10) Patent No.: US 6,517,029 B1
(45) Date of Patent: Feb. 11, 2003

(54) FRICTION AND STICTION COMPENSATION FOR SPACECRAFT ATTITUDE CONTROL

(75) Inventor: Thomas J. Holmes, Portola Valley, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 123 days.

(21) Appl. No.: 09/660,749

(22) Filed: Sep. 13, 2000

(51) Int. Cl.$^7$ ................................................. B64G 1/24
(52) U.S. Cl. ........................ 244/164; 244/165; 701/13
(58) Field of Search ................... 244/165, 164; 701/13

(56) References Cited

U.S. PATENT DOCUMENTS 6,138,952 A * 10/2000 Holmes ..................... 244/165
6,141,606 A * 10/2000 Reckdahl ................... 244/165
6,231,011 B1 * 5/2001 Chu et al. .................. 244/165

* cited by examiner

Primary Examiner—J. Woodrow Eldred
(74) Attorney, Agent, or Firm—Perman & Green, LLP

(57) ABSTRACT

A spacecraft attitude control system that enables friction and stiction compensation for attitude control of a spacecraft using at least one reaction wheels that can spin through zero rpm without degradation in pointing. The system removes nuisance disturbances relating to friction or stiction that detract from the ability of the system to maintain or change spacecraft attitude. It can remove these effects before they are sensed by the systems attitude control sensors. A friction or stiction compensation buffer is arranged between the spacecraft attitude control subsystem and the torque actuators for the at least one reaction wheel. Since the compensation is localized to each wheel, it is possible to optionally: control wheel operating speeds to safe levels, provide wheel failure flags, provide accurate wheel tracking at slow or zero wheel speeds and provide full access to the wheel torques.

20 Claims, 8 Drawing Sheets

FRICTION AND STICTION COMPENSATION FOR SPACECRAFT ATTITUDE CONTROL

BACKGROUND OF THE INVENTION

1. Field of the Invention

This invention relates to friction and stiction compensation in spacecraft attitude control. It is particularly useful with spacecraft attitude control systems using reaction wheels that can spin through zero rpm.

2. Prior Art

Momentum or reaction wheels capable of storing angular momentum are known for use as part of a spacecraft attitude control system to provide torque to change or maintain a desired orientation. A particularly difficult problem with this approach is the presence of friction and stiction during the slowing and zero rotation speed which occur during direction reversal of a reaction wheel. These disturbances detract form the ability of the attitude control system to maintain proper attitude. Friction can cause offset pointing of a spacecraft which is reaction wheel controlled. Stiction can occur while the bearings of a reaction wheel come to a halt while the wheel reverses direction. The result is uncertainty in the attitude control response.

Various systems are known for friction and stiction compensation for reaction or momentum wheels used in spacecraft attitude control. One example of a friction compensation system is described in U.S. Pat. No. 5,201,833 ('833) by Goodzeit et al. issued on Jul. 19, 1991. The '833 patent suggests that wheel bearing velocity reduces the actual torque imparted to the spacecraft in response to a torque command signal. Goodzeit teaches a system of friction compensation provided by applying a torque command signal to a model of an ideal friction-free wheel and calculating the speed the ideal wheel achieves in response to the torque command. An error signal is generated from the difference between the ideal wheel speed and the actual wheel speed. The error signal is summed with the torque command signal to produce the wheel drive signal. With such a system, the actual wheel speed tends toward the ideal speed, thereby causing a torque on the spacecraft which is substantially equal to that commanded.

A system for compensation of stiction in a reaction wheel is described in U.S. Pat. 5,020,745 ('745) by Stetson issued on Jun. 4, 1991. The '745 patent teaches overcoming the stiction existing in a reaction wheel when the reaction wheel is at a zero velocity state. Stiction is defined as a friction that tends to prevent relative motion between two moveable parts at their null position. The '745 patent teaches using a dither to overcome stiction. Dither is defined as a force having a controlled amplitude and frequency, applied continuously to a device driven by a servomotor so that the device is constantly in a small amplitude motion and cannot stick at its null position. The use of a dither signal is taught so as to control the energy added to the reaction wheel and reduces attitude errors caused by excessive torque to compensate for stiction during the direction reversal of a reaction wheel.

SUMMARY OF THE INVENTION

This invention attempts to minimize or eliminate frictional and stictional perturbations prior to their causing spacecraft attitude perturbations. There is provided an improved means for removing reaction wheel friction or stiction disturbances that detract from the ability of the attitude control system to maintain or shift the spacecraft to a desired attitude. This invention allows these disturbances to be removed before they cause spacecraft attitude changes which are sensed by the attitude control sensors. Preferably this invention comprises a buffer between a spacecraft attitude control subsystem and the torque actuators for applying torque to the reaction wheels. This invention delivers increased attitude pointing precision. This invention, being preferably localized to each wheel, is capable of providing significant additional benefits, including without limitation, safe operating speeds, wheel failure flags, accurate wheel tracking with limited tachometer information and full access to the wheel torques.

In accordance with a preferred embodiment of this invention there is provided a spacecraft attitude control system comprising: at least one reaction wheel responsive to a torque drive signal for torquing the spacecraft; means for generating a torque control signal; means for generating an estimate of friction signal for the at least one reaction wheel; means for detecting if stiction of the at least one reaction wheel is present; means for generating a stiction compensated estimate of friction signal responsive to the detecting means detecting the presence of stiction; and means for compensating for friction or stiction of the at least one reaction wheel by selectively correcting the torque control signal for friction or stiction errors to provide the torque drive signal, wherein the compensating means selectively utilizes the estimate of friction signal to correct the torque control signal when no stiction is present or the stiction compensated estimate of friction signal to correct the torque control signal when stiction is present.

In accordance with the preferred embodiment of this invention there is also provided a spacecraft attitude control process comprising: providing at least one reaction wheel responsive to a torque drive signal for torquing the spacecraft; generating a torque control signal; generating an estimate of friction signal for the at least one reaction wheel; detecting if stiction of the at least one reaction wheel is present; generating a stiction compensated estimate of friction signal responsive to detecting the presence of stiction; and compensating for friction or stiction of the at least one reaction wheel by selectively correcting the torque control signal for friction or stiction errors to provide the torque drive signal, wherein the compensating step selectively utilizes the estimate of friction signal to correct the torque control signal when no stiction is present or the stiction compensated estimate of friction signal to correct the torque control signal when stiction is present.

Accordingly, an object of the present invention is to provide desired wheel speeds for a spacecraft attitude controller whether or not the spacecraft reaction wheels experience friction and/or stiction.

A further object, in accordance with a preferred embodiment of this invention, is to minimize or eliminate frictional and stictional perturbations prior to causing any spacecraft perturbations which would result therefrom.

A still further object, in accordance with another preferred embodiment of this invention, is to provide safe limits for the spacecraft reaction wheel rotational speeds regardless of the torque demands from the spacecraft attitude controller.

A still further object, in accordance with another preferred embodiment of this invention, is to provide estimates of the spacecraft torque demands from the spacecraft attitude controller.

A further object, in accordance with another preferred embodiment of this invention, is to actively control both friction and stiction compensation for spacecraft pointing.

A further object, in accordance with another preferred embodiment of this invention, is to help the spacecraft attitude controller keep control of attitude throughout a reaction wheel stiction event.

A further object, in accordance with another preferred embodiment of this invention, is to provide information concerning the "health" of the reaction wheels to provide warning of their imminent failure, A further object, in accordance with another preferred embodiment of this invention, is to allow for appropriate attitude control during slow rates of rotation of a reaction wheel when infrequent pulses are provided by a typical pulse tachometer.

A further object, in accordance with another preferred embodiment of this invention, is to permit full reaction wheel torque saturation without unstable or oscillatory side effects.

DETAILED DESCRIPTION OF THE PREFERRED EMBODIMENTS

The present invention is preferably directed to minimizing or preventing degradation in pointing or attitude control of a spacecraft using reaction wheels that can spin through zero rpm. Some embodiments of this invention may have application to other spacecraft subsystems such as, for example, momentum wheels which do not spin through zero rpm.

This invention enables friction and stiction compensation for minimizing or eliminating degradation in spacecraft pointing associated with an attitude control system, including but not limited to, one which uses reaction wheels that can spin through zero rpm. It is an improvement over the alternative described in U.S. Pat. No. 5,020,745 to Stetson.

Friction can cause offset pointing in a reaction wheel controlled spacecraft. Compensation for friction will improve pointing performance. Stiction can occur when the bearings of the reaction wheels come to a halt while the wheels reverse direction. Stiction causes an increase in the force required to break the bearings of the reaction wheels free from a static or nonmoving condition. Friction and stiction cause uncertainty in the control response of a spacecraft attitude control system. Friction and stiction compensation improve spacecraft pointing performance of an attitude control system by reducing this uncertainty.

This invention preferably provides a means for removing nuisance disturbances associated with friction and stiction effects on reaction wheels before they show up at the attitude control sensors. This invention is provides a compensation buffer between an attitude control subsystem and the torque actuators of a conventional attitude control system thereby providing increased attitude pointing precision. This invention preferably corrects for frictional and stictional effects before the attitude of the spacecraft is corrupted. The nature of this invention being localized to each momentum or reaction wheel, provides additional improved embodiments, including without limitation, maintaining safe operating speeds of the wheels, providing wheel failure flags or warnings, providing accurate wheel tracking with limited tachometer information and providing full access to the wheel torques.

In the description which follows corresponding elements may be given the same reference number.

Figure 1:
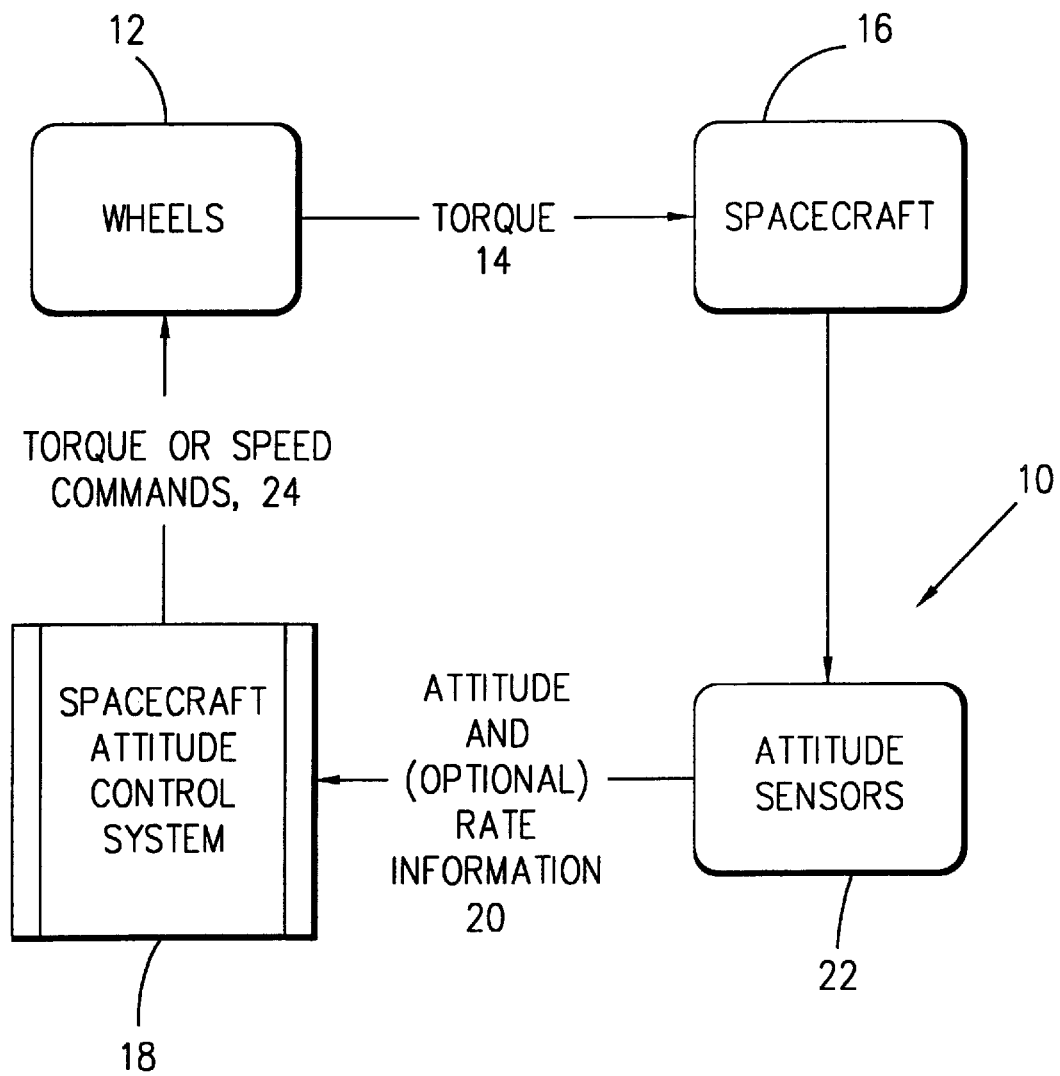
FIG. 1 is a block diagram illustration of a typical prior art spacecraft attitude control system.

FIG. 1 illustrates in simplified block diagram form the control scheme of a typical prior art closed loop spacecraft attitude control system 10. As can be seen from FIG. 1 the attitude control system 10 includes a spacecraft attitude control subsystem 18 which receives attitude and (optionally) rate information 20 from attitude sensors 22. The attitude sensors 22 sense, by any desired conventional means, the attitude parameters of the spacecraft 16. The spacecraft attitude control subsystem 18 sends torque or speed command signals 24 to the reaction wheels 12. The reaction wheels 12 provide torque corrections 14 to spacecraft 16 to control the pointing of the spacecraft 16. Further illustrations of spacecraft attitude control systems 10 of the prior art are set forth in the Stetson and Goodzeit et al patents mentioned above, which are specifically incorporated by reference herein.

Figure 2:
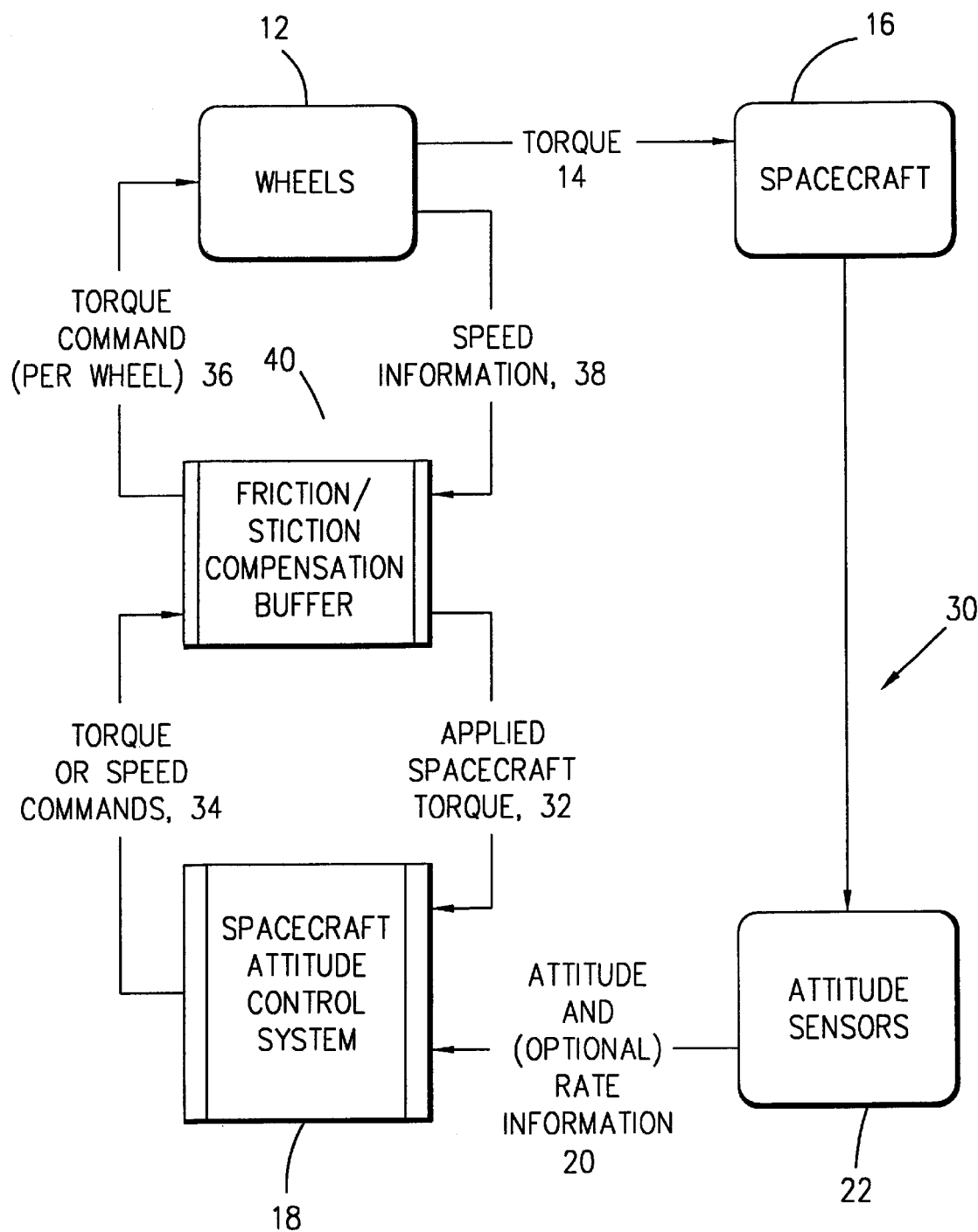
FIG. 2 is a block diagram illustration of a spacecraft attitude control system in accordance with a preferred embodiment of this invention.

This invention does not replace any of the elements of the spacecraft attitude control system 10 shown in FIG. 1. Rather as shown in FIG. 2, in accordance with a preferred embodiment of this invention, a spacecraft attitude control system 30 is provided with a friction/stiction compensation buffer subsystem 40 of this invention between the spacecraft attitude control subsystem 18 and the torque activators or servos of conventional design (not shown) for the reaction wheels 12. The spacecraft attitude control system 30 of this embodiment receives speed information signals 38 from the reaction wheels 12 and torque or speed command signals 34 from the spacecraft attitude control subsystem 18. Friction/stiction compensation buffer 40 provides torque command signals 36 to one or more of the reaction wheels 12 and an applied spacecraft torques feedback signal 32 to the spacecraft attitude control subsystem 18. It can be seen from this FIG. 2 that the buffer 40 effectively provides an additional pseudo sensor for torque to the spacecraft attitude control subsystem. Frictional effects on the reaction wheels 12 are compensated for in accordance with this embodiment of the invention by actively computing the friction levels using the tachometer information signal 38 fed back from the reaction wheels 12.

Typically, spacecraft 16 have two or three axes of active control (not shown), but the reaction wheels 12 are not necessarily aligned in the axes. This embodiment of the invention provides a means for the reaction wheels 12 to have high localized authority for each wheel, while the attitude control system 30 works on stabilizing and pointing the spacecraft 16.

Figure 3:
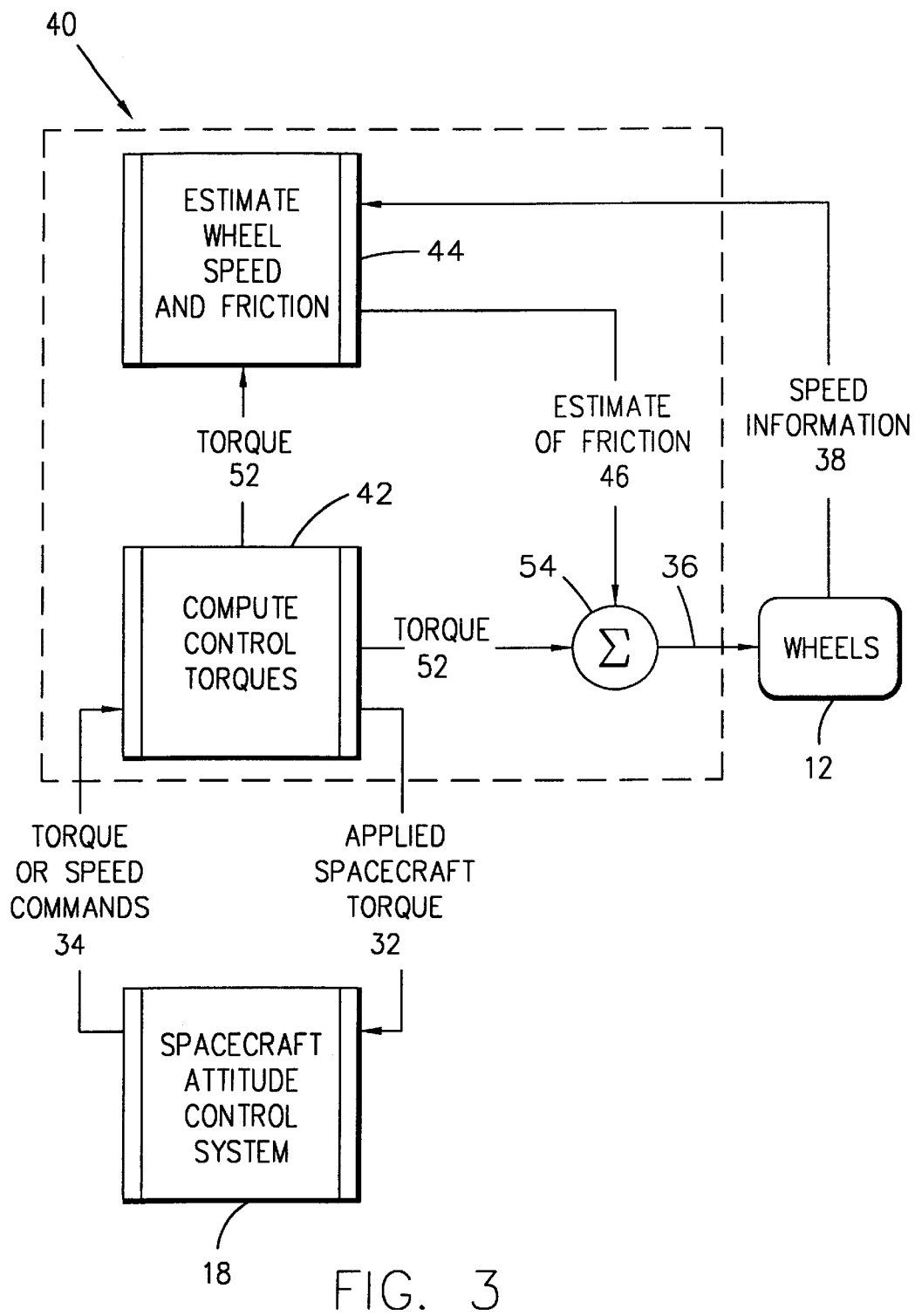
FIG. 3 is a block diagram illustration of a friction/stiction compensation system in accordance with a preferred embodiment of this invention.

Referring now to FIG. 3 there is shown by way of example, a simplified block diagram scheme providing further detail of the buffer subsystem 40 for removal of friction effects in accordance with the embodiment of FIG. 2. Since at low speeds, the tachometer (not shown) returns a zero speed information signal 38 for extended periods of time, in accordance with the preferred embodiment of this invention, there is provided an estimate wheel speed and friction device 44 which provides means for estimating the speed of each of the wheels 12 as well as estimates of their friction levels, all in the absence of tachometer information. In the absence of tachometer information friction effects are compensated for by correcting the desired spacecraft 16 torque command signals 34 with the estimated friction levels from the device 44. This reduces or eliminates such friction effects from the torque command signals prior to applying a control torque to one or more of the wheels 12, thereby providing improved pointing of the spacecraft 16 by compensating for these friction perturbations prior to their affecting spacecraft pointing.

The conventional spacecraft attitude control subsystem 18 (shaded portion of FIG. 3), which may be of any desired design as are known in the art, receives an applied spacecraft torque information signal 32 from a compute control torques device 42. The spacecraft attitude control subsystem 18 provides torque or speeds command signals 34 to the compute control torques device 42. The compute control torques device 42 provides a torque signal 52 to the estimate wheel speed and friction device 44 and to summer 54. The estimate wheel speed and friction eliminate device 44 receives a speed information signal 38 from each of the reaction wheels 12 and provides an estimate of wheel friction signal 46 to summer 54. Summer 54 sums the torque signal 52 with the estimate of friction signal 46 and provides a torque command 36, which includes compensation for friction effects, to one or more of the reaction wheels 12. In accordance with this embodiment of the invention, frictional effects 46 on the reaction wheels 12 are added to the wheel torques 52 by summer 54 so that the spacecraft attitude control system 30 can expect essentially nominal performance as if no friction existed.

When wheel 12 frictional levels are too high, signals 46 can be used to trigger an alarm in a conventional manner (not shown) to warn of impending reaction wheel 12 failure, since unusually high function levels suggest bearing or electrical winding failure. Since the reaction wheel speeds are constantly monitored in accordance with the preferred embodiment of this invention, it is possible to control reaction wheel 12 speed so that no additional torque commands 36 will be issued which would result in a reaction wheel 12 exceeding a safe operating speed.

Figure 4:
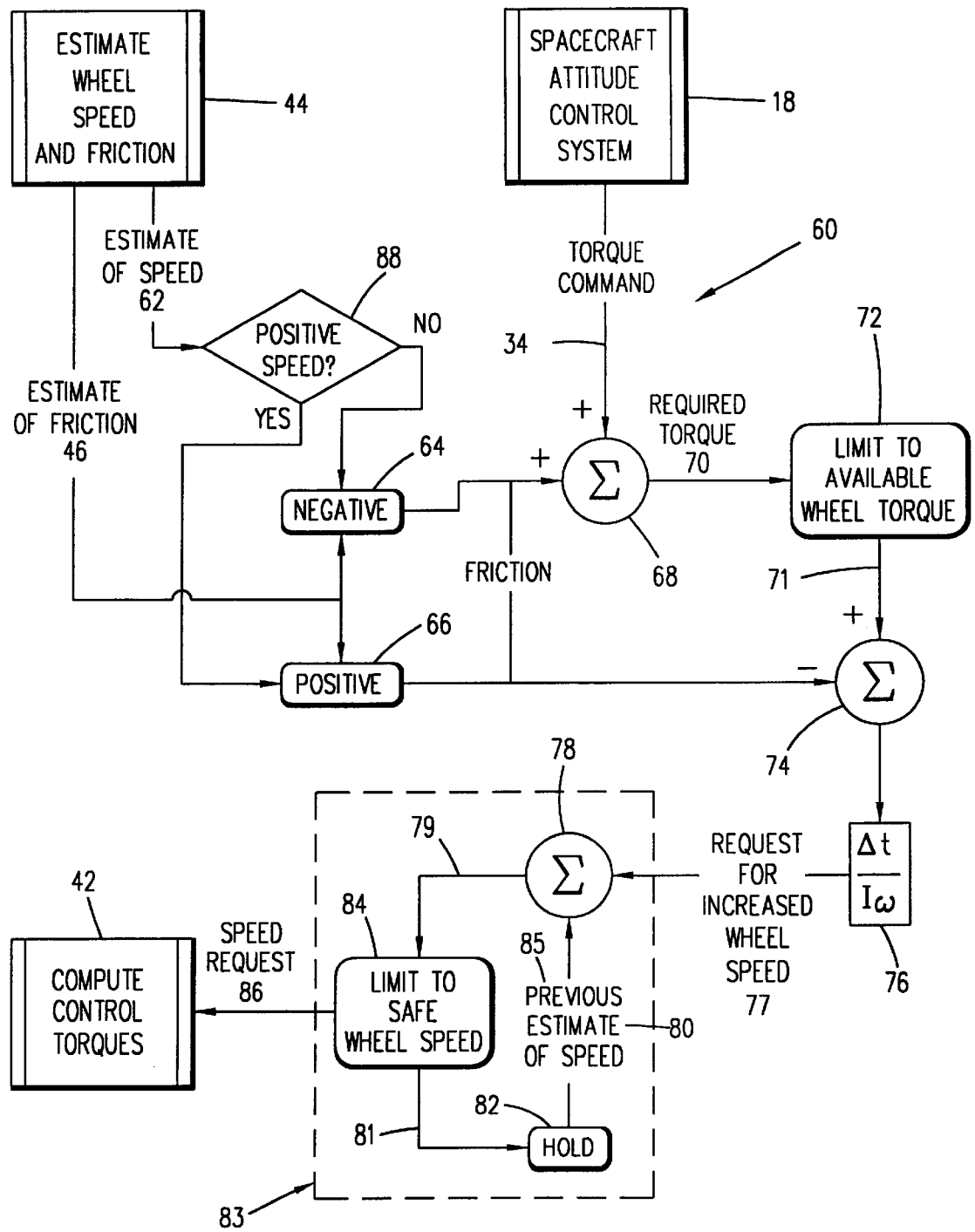
FIG. 4 is a block diagram illustration showing in further detail showing how the torques and speeds of the reaction wheels are limited to the wheel capabilities in accordance with a preferred embodiment of this invention.

Referring now to FIGS. 2–4; FIG. 4 shows a simplified block diagram which illustrates how the torque command signals 34 which are inputed to the buffer 40 of this invention are. monitored and adjusted to prevent increases in reaction wheel 12 speeds that are beyond the capability of the reaction wheels 12. This is one of the improvements provided by the buffer 40, as it permits the spacecraft attitude control subsystem 18 to issue torque commands 34 without applying unbounded torque requests to the reaction wheels 12. Without the buffer 40 the desired friction wheel 12 speed would continue to grow if the reaction wheels 12 could not provide the requested torques, causing potential failures of the reaction wheels due to excessive speed. This reaction wheel speed control function can be easily included in the preferred embodiment of the buffer 40 because it utilizes the estimate of friction 46 provided by the estimate wheel speed and friction device 44.

Estimate wheel speed and friction device 44 provides estimates of wheel speed 62 and wheel friction 46 signals. The estimate of speed 62 signal is coupled to decision device 88 to determine whether the speed is a positive speed or a negative speed relative to a specific rotation direction of the reaction wheels 12. The estimate of friction 46 signal is coupled to both a positive speed device 66 and a negative speed device 64. When a positive speed is detected, the friction estimate signal 46 is coupled to a negative input of summer 74. When a negative speed is detected a friction estimate signal 46 is coupled to a positive input of summer 68. Spacecraft control subsystem 18 provides a torque command signal 34 to a second positive input of summer 68. Summer 68 produces a required torque signal 70 which is coupled to a limit to available wheel torque device 72 which limits the output torque signal 71 to the available wheel 12 torque. Device 72 generates a required torque signal 71, is limited to the available wheel 12 torque, which is coupled to a positive input of summer 74. Summer 74 sums the output torque signal 71 as limited above with the friction estimate signal 46 when the speed of the reaction wheels is positive.

The output of summer 74 is coupled to device 76 which calculates Δt/Iω, where Δt is the CPU update time and L. is the wheel inertia. Device 76 provides a request for increased wheel speed signal 77 to summer 78. Summer 78, a limit to safe wheel speed device 84 and hold circuit 82 provide a closed loop subsystem 83 that provides a speed request signal 86 which is coupled to the compute control torques device 42. The output signal 79 from the summer 78 is coupled to the limit to safe wheel speed device 84 which provides a speed increase request signal 86 to the compute control torques device 42 if the friction wheel 12 speed increase is within acceptable limits which are included in the limit to safe wheel speed device 84. If the speed increase request signal 86 would cause the friction wheel 12 to increase speed beyond the acceptable limits then a hold signal 81 is coupled to the hold device 82 which then limits the feedback signal 80 which is coupled to the summer 78 to the previous estimate of speed signal 85 for the friction wheels 12.

In accordance with this embodiment of the invention the spacecraft attitude control subsystem 18 will be notified of any reduction in torque caused by limitations in wheel speed capabilities by the applied spacecraft torque signal 32 which it receives from the compute control torques device 42 as shown in FIG. 3, and can invoke other spacecraft attitude correction approaches using other means such as thruster firings, increased magnetic torque currents, etc., as are well known in the art. The same is true for torque limitations. The spacecraft attitude control subsystem 18 can issue whatever torque or speed command 34 it wants without regard for torque accumulation, and in accordance with this invention the compute control torques device 42 will feedback the applied spacecraft torque signal 32 indicating what torques actually reached the spacecraft.

Figure 5:
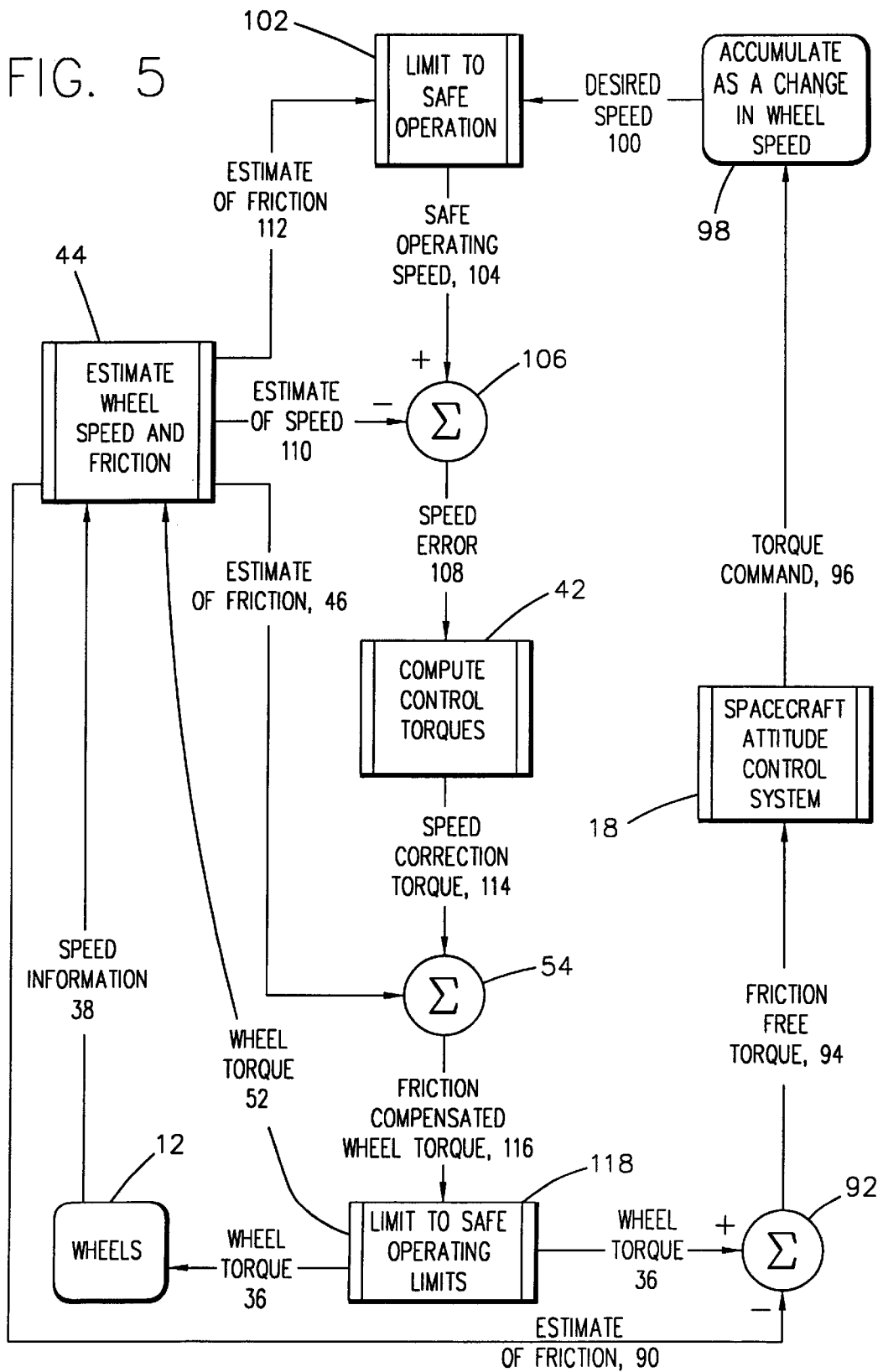
FIG. 5 is a block diagram illustration showing in still further detail how the reaction wheel speed and torque requests are processed in accordance with a preferred embodiment of this invention.

Referring now to FIG. 5 as well, there is shown a simplified block diagram in accordance with a preferred embodiment of this invention which illustrates how the reaction wheel 12 speed and torque requests are processed. Estimate wheel speed and friction device 44 receives a speed information signal 38 from the reaction wheels 12 and a wheel torque information signal 52 from a limit to safe operating limits device 118. Device 44 provides estimate of friction signals 112, 46 and 90 as well as an estimate of wheel speed signal 110. Spacecraft attitude control subsystem 18 (shaded portion of FIG. 5) generates a torque command signal 96 to an accumulate as a change in wheel speed device 98 to produce a desired speed signal 100 which is coupled to a limit to safe operation device 102 which also receives the estimate of friction signal 112 from the estimate wheel speed and friction device 44. The limit to safe operation device 102 provides a safe operating speed signal 104 to a positive input of summer 106. The summer 106 sums this safe operating speed signal with the estimate of speed signal 110 which is coupled to a negative input of summer 106 to produce a speed error signal 108 which is coupled to compute control torques device 42. The resulting computation generates a speed correction torque signal 114. This speed correction torque signal 114 is coupled to summer 54 where it is summed with the estimate of friction signal 46 to produce a friction compensated wheel torque signal 116. This friction compensated wheel torque signal 116 is coupled to the limit to safe operating limits device 118. The limit to safe operating limits device 118 produces wheel torque signals 36 which are coupled to the reaction wheels 12 and to a positive input of summer 92. It also generates wheel torque signal 52 which is coupled to the estimate wheel speed and friction device 44. Summer 92 sums the estimate of friction signal 90 and the wheel torque signal 36 to provide a friction free torque signal 94 for feedback to the spacecraft attitude control subsystem 18.

This invention provides the ability to estimate friction and friction wheel 12 speed at very low speeds where the tachometer output is nominally zero. As the friction wheel 12 speed approaches reversing sign, however, the stiction process begins, and the ability to estimate friction breaks down. At that point, the compensation buffer 40 of this embodiment of the invention, ceases to estimate friction while continuing to estimate speed. The buffer 40 assumes that the estimate of friction will remain constant through the speed reversal process, but simply reverse its sign as the friction wheel 12 reverses direction. Further, the buffer 40 assumes that stictional torques are much larger than frictional torques, and therefore it increases the frictional correction torque by a given factor times the assumed constant friction.

Figure 6:
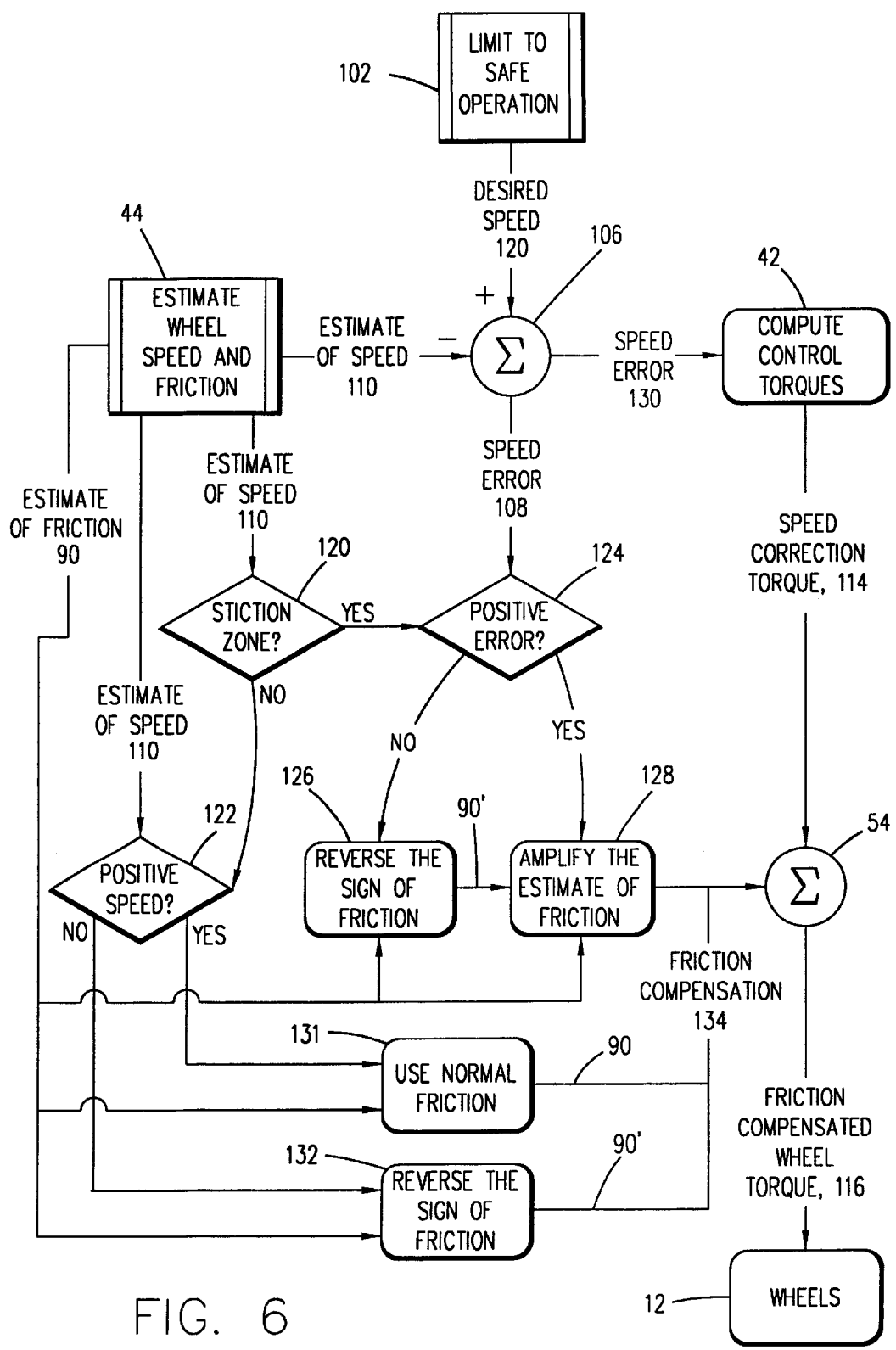
FIG. 6 is a block diagram illustration showing in still further detail how the controller "leaps" through the stiction zone in accordance with a preferred embodiment of this invention.

Referring now to the block diagram in FIG. 6 which illustrates how, in accordance with a preferred embodiment of the invention, the friction/stiction compensation buffer 40, during expected stiction, corrects for wheel 12 friction and stiction using the sign of the error of the desired speed, instead of the current speed. This is done to effectively "leap" through the stiction zone, since it is impossible to detect whether or not the friction wheel 12 is sticking.

Limit to safe operation device 102 provides a desired speed signal 120 to a positive input to summer 106. Estimate wheel speed and friction device 44 provides an estimate of speed signal 110 to a plurality of inputs as well as an estimate of friction signal 90. One of the estimate of speed signals 110 is coupled to a negative input of summer 106. Summer 106 produces a speed error signal 130 based on the sum of desired speed signal 120 and the estimate of speed signal 110. From this speed error signal 130, the compute control torques device 42 computes a speed correction torque signal 114.

The estimate of wheel speed signal 110 is also coupled to the stiction zone detector or decision device 120. If the stiction zone detector 120 indicates that the reaction wheel 12 is outside the stiction zone the, namely, there is no stiction then a positive speed detector or decision device 122 is enabled. Another estimate of speed signal 110 is coupled to the positive speed detector 122 and a further estimate of speed signal 110 is coupled to a stiction zone detector 120. If there is a positive speed, the positive speed detector 122 instructs a use nominal friction device 131 to output the estimate of friction signal 90. If the positive speed detector 122 detects a negative speed, it instructs reverse the sign of friction device 132 to reverse the sign of friction signal 90 and output it as a reverse sign friction signal 90'.

However, if the estimate of wheel speed is inside the stiction zone, then the stiction zone detector 120 instructs a positive error detector or decision device 124 to determine whether speed error signal 108 is positive or negative. If the speed error signal 108 is negative, the reverse the sign of friction device 126 is enabled and reverses the sign of the estimate of friction 90 it receives from the estimate wheel speed and friction device 44. This reversed sign estimate of friction 90' is coupled to an amplifier 128 which amplifies the reversed sign estimate of friction 90'. If the speed error is positive the estimate of friction signal 90 is directly coupled to amplifier 128. The amplifier 128 increases the estimate of friction signal 90 or 90' by a given factor times the assumed constant estimate of friction signal 90 or 90' thereby compensating for stictional effects.

Amplifier 128 and devices 131 and 132 all produce a friction compensation signal 134 which is coupled to a second input of summer 54. The output of summer 54 is a friction compensated wheel torque signal 116 which is coupled to the reaction wheels 12.

The preferred embodiment of this invention will now be described in greater detail in order to further demonstrate how this invention obtains estimates of the friction wheel 12 speeds and friction, even at slow speeds when a pulse tachometer produces a zero signal for extended periods of time. Continuous tachometers more easily provide these estimates. This invention works with either type. The friction wheel 12 speed is estimated assuming that friction is always positive and always provides a torque which would reduce the wheel speed. This estimate preferably assumes that the wheel torque command 36 will change the wheel 12 speed proportional to the inverse inertia of the wheel 12.

Figure 7:
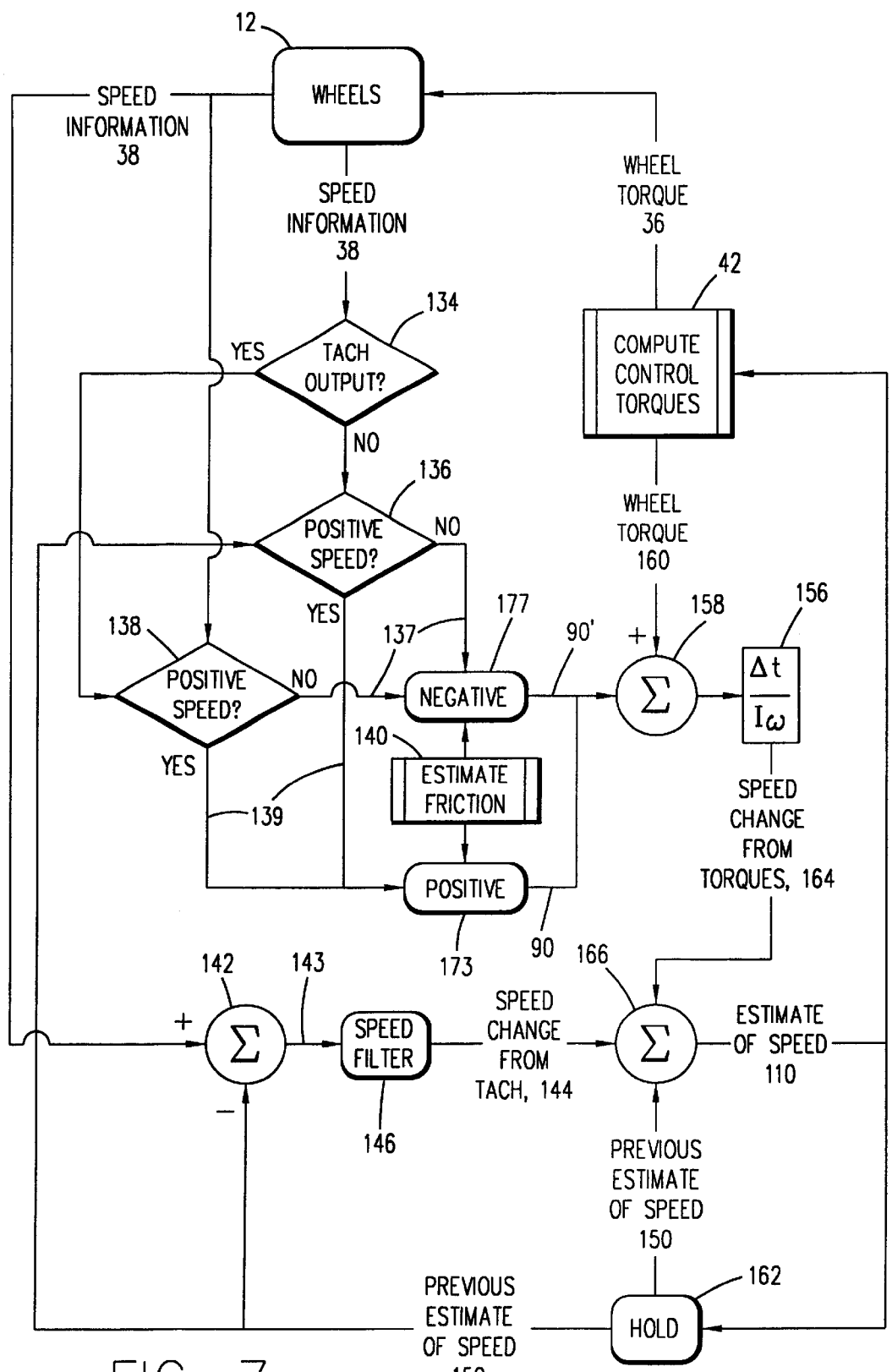
FIG. 7 is a block diagram illustration showing in still further detail how the reaction wheel speeds are estimated in accordance with a preferred embodiment of this invention.

FIG. 7 is a block diagram which illustrates how a preferred embodiment of this invention determines the direction of the friction wheel 12 spin using tachometer information when available, or the estimate of the friction wheel 12 speed. In accordance with this embodiment the sign of friction is adjusted based on the wheel 12 spin direction in order to assure that the speed is properly controlled.

Reaction wheels 12 provide a speed information signal 38 to tachometer output detector 134, positive speed detector 138 and a positive input of summer 142. If there is output from tach output device 134, then positive speed detector or decision device 138 is enabled to couple an estimate friction device 140 to summer 158 as a positive friction signal 90 or a negative friction signal 90' based on whether the speed information signal 38 from the reaction wheel or wheels 12 is positive or negative. The positive or negative friction signal 90 or 90' is coupled to a negative input of summer 158. The second input to summer 158 is a wheel torque signal 160 from the compute control torques device 42. The output of summer 158 is coupled to device 156 which calculates $\Delta t/I\omega$, where $\Delta t$ is the CPU update time and $I\omega$ is the wheel inertia to generate a speed change from torques signal 164. Signal 164 is coupled to summer 166 along with speed change tach signal 148 and previous estimate of speed signal 150 to produce an estimate of speed signal 110 signal.

If there is no tach output, positive speed detector 136 provides the positive or negative estimates of friction signals 90 or 90' based on a previous estimate of speed signal 150 received from hold circuit 162. Speed information signal 38 is also coupled to a positive input of summer 142. The previous estimate of speed signal 150 is coupled to a negative input of summer 142. The summed signal 143 from summer 142 is coupled to a speed filter 146 to produce a speed change from tach signal 148 which as previously described is coupled to summer 166. The estimate of speed signal 110 is also coupled to the compute control torques device 42 which uses this estimate of speed signal 110 to compute the wheel torque command signal 36 which is coupled to the reaction wheels 12. This invention uses a tachometer to continuously update estimates of friction 90 or 90' and estimate of speed 110 signals during nominal operation.

Figure 8:
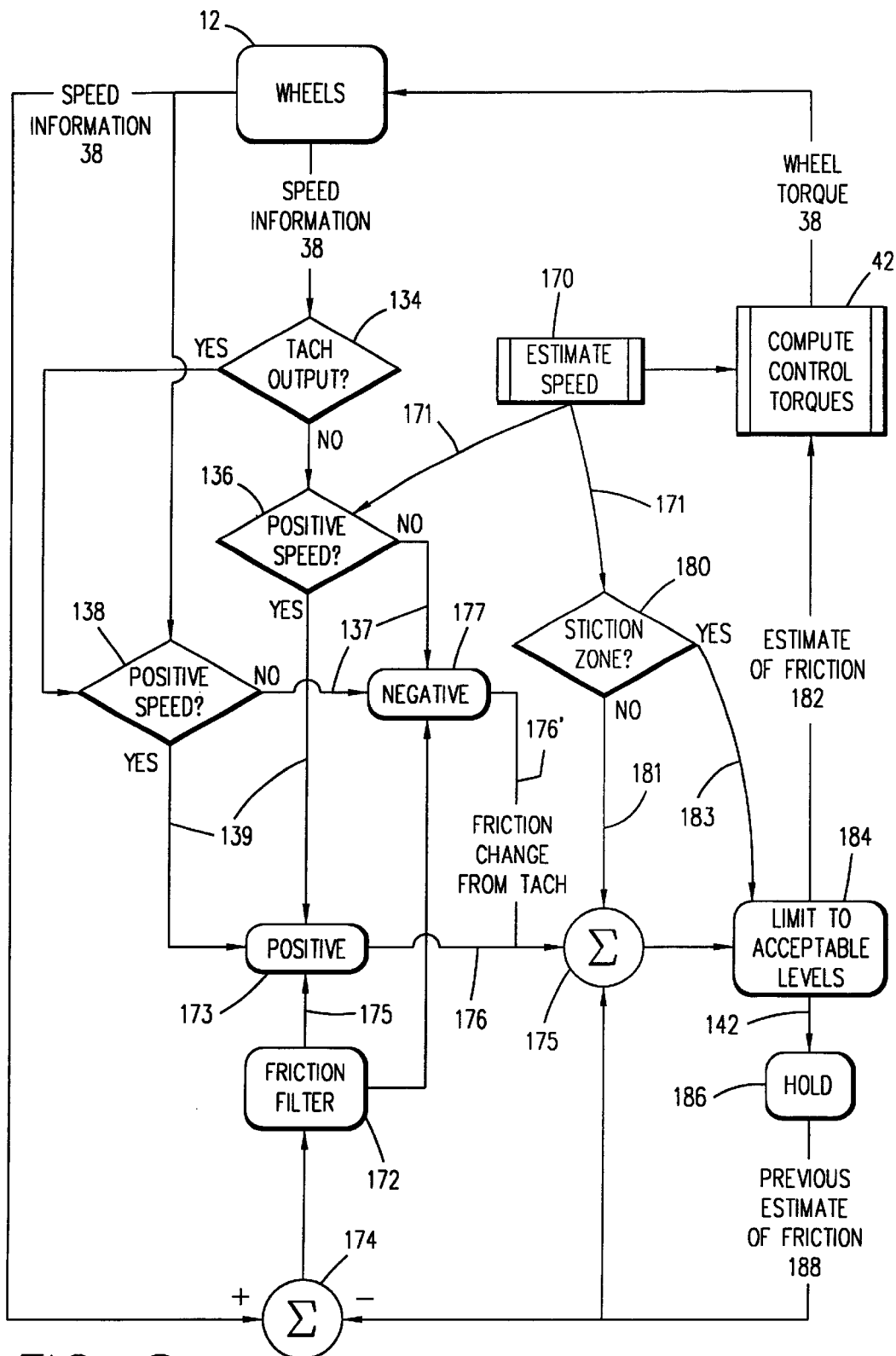
FIG. 8 is a block diagram illustration showing in still further detail how friction is estimated in accordance with a preferred embodiment of this invention.

Referring now to the simplified block diagram in FIG. 8 there are shown further details in accordance with a preferred embodiment of this invention relating to how friction is estimated. Reaction wheels 12 provide the speed information signal 38 to positive speed detector 138, tach output detector 134 and to the positive input of summer 174. If there is no tach output, tach output detector 134 instructs positive speed indicator 136 to determine whether the estimate of speed signal 171 provided by estimate speed device 170 is positive or negative. If positive speed detector 138 or positive speed detector 136 indicate a positive speed by generating a "yes" signal 139, they instruct the positive speed device 173 to couple the output signal 175 of a friction filter device 172 as a positive friction change from tach signal 176 to a first input of summer 178. If either positive speed indicator 136 or 138 indicate a negative speed by generating a "no" signal 137, they instruct the negative speed device 177 to couple the output signal 175 of the friction filter device 172 as a negative friction change from tach signal 176' to the first input of summer 178.

Stiction zone detector 180 also receives an estimate of speed signal 171 from estimate speed device 170 for detecting whether of not a stiction zone exists. If no stiction exists the detector 180 issues a "no" signal 181 which is coupled to a further input of summer 178. If stiction exists the stiction detector 180 issues a "yes" signal 183 which is coupled to the limit to acceptable levels device 184. The output of summer 178 is also coupled to the device 184. The limit to acceptable levels device 184 provides estimate of friction signals 182 which are respectively coupled to a hold circuit 186 and the compute control torques device 42. The hold circuit generates a previous estimate of friction signal 158 which is coupled to an input of summer 178 and a negative input of summer 174. The compute control torques device 42 provides wheel torque commands 36 to the reaction wheels 12. Therefore, in accordance with this invention the estimate of friction during stiction and non-stiction times is used to minimize frictional and stictional perturbations prior to any spacecraft perturbations.

It should be understood that the foregoing description is only illustrative of the invention. Various alternatives and modifications can be devised by those skilled in the art without departing from the spirit of the invention. Accordingly, the present invention is intended to embrace al such alternatives, modifications and variances which fall within the spirit and scope of the appended claims.

What is claimed is:

1. A spacecraft attitude control system comprising:
   at least one reaction wheel responsive to a torque drive signal for torquing said spacecraft;
   means for generating a desired torque control signal;
   means for generating an estimate of friction signal for said at least one reaction wheel;
   means for detecting if stiction of said at least one reaction wheel is present;
   means for generating a stiction compensated estimate of friction signal responsive to said detecting means detecting the presence of stiction; and
   means for compensating for friction or stiction of said at least one reaction wheel by selectively correcting said desired torque control signal for friction or stiction errors to generate said torque drive signal, wherein said compensating means selectively utilizes said estimate of friction signal to correct said torque control signal when no stiction is present or said stiction compensated estimate of friction signal to correct said torque control signal when stiction is present.

2. A spacecraft attitude control system as in claim 1, wherein said means for generating said stiction compensated estimate of friction signal comprises means for multiplying said estimate of friction signal by a given factor.

3. A spacecraft attitude control system as in claim 2, wherein said means for generating an estimate of friction signal for said at least one reaction wheel also includes means for generating an estimate of speed signal for said at least one reaction wheel even at slow or zero speeds of said reaction wheels and wherein said means for detecting stiction is responsive to said estimate of speed signal.

4. A spacecraft attitude control system as in claim 3, further including means for limiting said reaction wheels to safe operational rotation speeds regardless of the demands of the means for generating torque control signals for additional torques.

5. A spacecraft attitude control system as in claim 3, further including means responsive to said estimate of friction signal for warning of potential friction wheel failure.

6. A spacecraft attitude control system as in claim 3, further includes means for feeding back to the means for generating a torque control signal a signal indicating applied spacecraft torque.

7. A process for controlling the attitude of a spacecraft comprising:
   providing at least one reaction wheel responsive to a torque drive signal for torquing said spacecraft;
   generating a desired torque control signal;
   generating an estimate of friction-signal for said at least one reaction wheel;
   detecting if stiction of said at least one reaction wheel is present;
   generating a stiction compensated estimate of friction signal responsive to the detection of the presence of stiction; and
   compensating for friction or stiction of said at least one reaction wheel by selectively correcting said desired torque control signal for friction or stiction errors to generate said torque drive signal, wherein said compensating step selectively utilizes said estimate of friction signal to correct said torque control signal when no stiction is detected in said stiction detection step or said stiction compensated estimate of friction signal to correct said torque control signal when stiction is detected.

8. A spacecraft attitude control process as in claim 7, wherein said step of generating said stiction compensated estimate of friction signal comprises multiplying said estimate of friction signal by a given factor.

9. A spacecraft attitude control process as in claim 8, further including generating an estimate of speed signal for said at least one reaction wheel even at slow or zero speeds of said reaction wheels and wherein said detecting stiction step is responsive to said estimate of speed signal.

10. A spacecraft attitude control process as in claim 9, further including the step of limiting said reaction wheels to safe operational rotation speeds regardless of any demands for additional torques generated by said step of generating torque control signals.

11. A spacecraft attitude control process as in claim 9, further including means responsive to said estimate of friction signal for warning of potential friction wheel failure.

12. A spacecraft attitude control process as in claim 9, further including the step of providing feed back of a signal indicating applied spacecraft torque for use in the step of generating a torque control signal.

13. A spacecraft attitude control system comprising:
   a spacecraft;
   at least one reaction wheel adapted for responding to applied torque or speed command signals for torquing said spacecraft to adjust or maintain its attitude;
   a spacecraft attitude control subsystem for generating a desired reaction wheel speed or torque command signal; and
   a friction or stiction compensation buffer subsystem receiving said desired reaction wheel speed or torque command signals from said spacecraft attitude control subsystem and adapted to correct errors in said desired signals and responsive thereto generate said torque or speed command signals for application to said reaction wheels, said errors being associated with friction or stiction of said reaction wheels.

14. A spacecraft attitude control system as in claim 13 wherein, the compensation buffer subsystem provides feed back of an applied spacecraft torque command signal to the spacecraft attitude control subsystem and wherein said at least one reaction wheel provides a speed information signal to said compensation buffer subsystem.

15. A spacecraft attitude control system as in claim 14 wherein said compensation buffer subsystem comprises:
   a compute control torques device;
   an estimate reaction wheel speed and friction device; and
   a summing device;
   said speed information signal from said at least one reaction wheel being coupled to said estimate wheel speed and friction device;
   said desired torque or speed command signals from said spacecraft attitude control subsystem being coupled to the compute control torque device;
   computed torque command signals from said compute control torques device being coupled to said estimate wheel speed and friction device;
   said summing device receiving computed torque command signals from said compute control torques device and estimate of friction signals from said estimate wheel speed and ftiction device; and
   summed outputs of said summing device being coupled to said at least one reaction wheel as said applied torque or speed command signals.

16. A spacecraft attitude control system as in claim 15 further comprising: a decision device for determining whether said estimate of speed signal from said estimate wheel speed and friction device is positive or negative and means responsive thereto for coupling a positive or negative estimate of friction signal to the summing device.

17. A spacecraft attitude control system as in claim 14, further including means responsive to said estimate of friction signal for warning of potential friction wheel failure.

18. A spacecraft attitude control system as in claim 14 further comprising:
   means for limiting said at least one reaction wheel to a safe speed irrespective of said desired speed or torque signal.

19. A spacecraft attitude control system as in claim 14 wherein said compensation buffer further comprises:
   a decision device for detecting if stiction of said at least one reaction wheel is present; means for generating a stiction compensated estimate of friction signal responsive to said decision device detecting the presence of stiction; and means for selectively coupling said estimate of friction signal to said summer device when no stiction is present or said stiction compensated estimate of friction signal to said summer device when stiction is present.

20. A spacecraft attitude control system as in claim 19, wherein said means for generating said stiction compensated estimate of friction signal comprises means for multiplying said estimate of friction signal by a given factor.

* * * * *